United States Patent [19]

Elliano

[11] Patent Number: 4,899,173

[45] Date of Patent: Feb. 6, 1990

[54] TIME CLOCK DEVICE

[75] Inventor: Jack L. Elliano, North Hollywood, Calif.

[73] Assignee: Electra Print Time Recorder Company, Hollywood, Calif.

[21] Appl. No.: 183,925

[22] Filed: Apr. 20, 1988

[51] Int. Cl.[4] ........................ G01D 15/10; G06K 7/10; B41J 29/38; B41F 1/00

[52] U.S. Cl. ................................. 346/82; 346/76 PH; 101/66; 101/93.08; 101/287; 400/54; 235/377

[58] Field of Search ............. 346/760 H, 82; 400/120, 400/586, 54; 101/66, 93.04, 93.08, 287; 235/377

[56] References Cited

U.S. PATENT DOCUMENTS 2,778,304 1/1957 Juhas .................................. 101/298

4,560,292 12/1985 Takahashi ............................ 400/59

*Primary Examiner*—Bruce A. Reynolds
*Assistant Examiner*—Gerald E. Preston
*Attorney, Agent, or Firm*—Sanford Astor

[57] ABSTRACT

This invention relates to a time clock device, which contains a hinged time card shelf, which is adapted to be pressed down by the user of the time clock when he inserts his time card into the time clock. Upon pressing down on the time card and time card shelf, which the operator can do with one hand, the time, date, and other desired information, is printed onto the time card by a thermal printer which is actuated by a switch activated by the movement of the time card shelf to its lower or pushed down position.

5 Claims, 1 Drawing Sheet

TIME CLOCK DEVICE

BACKGROUND OF THE INVENTION

Time clocks or time recorders have been in use since approximately 1880. Large numbers of employees required individual time cards and the time clocks were built with heavy steel and brass parts to take the beating of the use of many employees. However, this constant use promoted wear and breakdowns no matter how well the parts were manufactured.

Time clocks which utilized ribbons had to be monitored and changed periodically. Eventually, mass production of compact time recorders of many types occurred.

Eventually, much more sophisticated time clock devices were invented, including those using micro processors to operate the time clock and to calculate total numbers of hours worked of each employee. A time clock of this nature is described in U.S. Pat. No. 4,170,015.

The time recorder has always done one basic thing, it has printed the time on a chart or time card. The employee time card is an extremely important piece of information. Most state laws and, in addition, many union agreements require that hourly employees must have their hours of employment recorded in a manner which can be verified. The usual time card has served this purpose for many years. It gives the employee a printed record of his time of arrival and time of departure. Many of today's time clocks, however, have gotten quite sophisticated and are somewhat difficult to use and operate. A need has existed in the field for a simple and effective time clock device which can be easily used and operated by the employee.

It is an object of the present invention to provide a simple, inexpensive time clock which is easily used by the employee.

Yet another object of the invention is to provide a simple time clock which reduces to a minimum the problem of blurring of the print when the time card is inserted into the time clock and activated.

These and other objects will be obvious from the following description together with the drawings in which.

Figure 1:
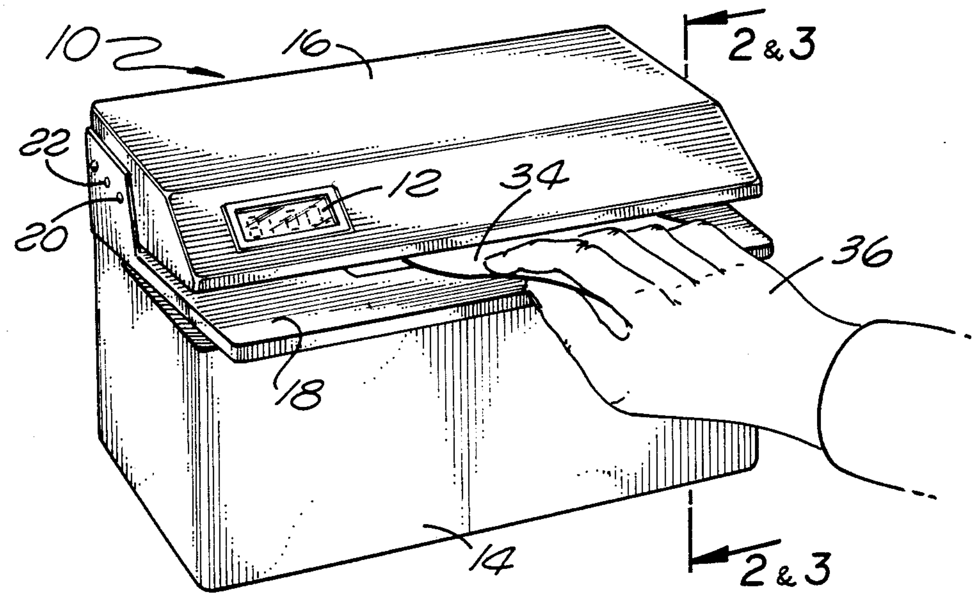
FIG. 1 is an illustration of the use of the time clock of the present invention.
Figure 2:
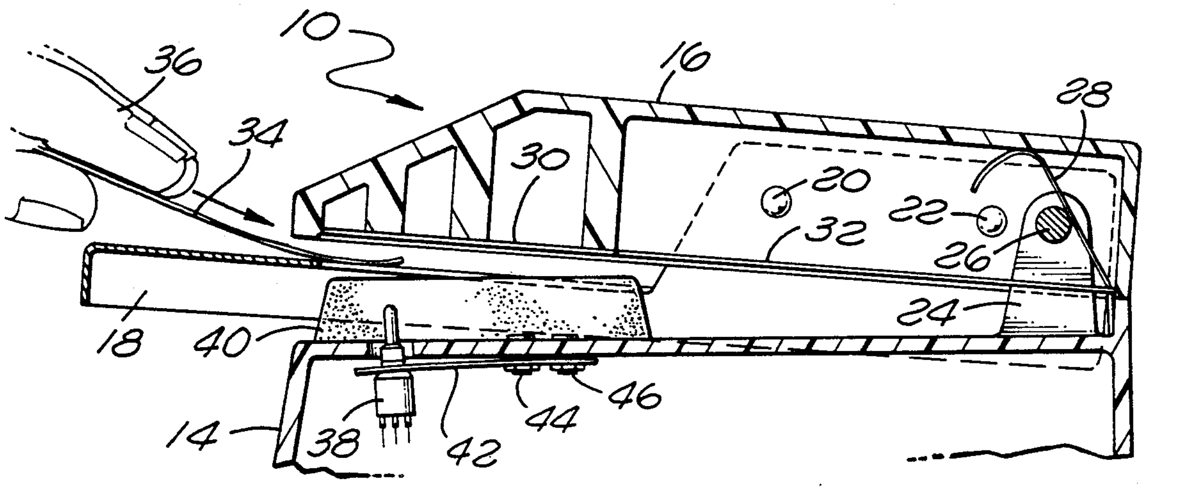
FIG. 2 is a section taken along lines 2—2 of FIG. 1 showing the time clock with the card shelf in the raised position.

Referring now to the drawings, there is shown an illustration of the time clock 10 of the present invention containing a time display register 12. The time clock 10 comprises a body portion 14 and a lid portion 16.

A card shelf 18 is fixedly attached to the lid portion 16 by any convenient method such as bolts 20, 22.

The lid portion 16 is allowed to raise and lower by its connection to a hinge 24 which allows the lid portion to rotate on pivot point 26. The lower portion of the hinge 24 is fixedly attached to the body portion 14 while the pivot portion 26 is rotatable attached to the lid portion 16.

A return spring 28, or a pair of return springs, one on each end of the time clock, bias the lid 16 in its upward, raised or open position.

The lid portion 16 contains a thermal print head 30, adapted to be actuated when the lid 16 is pressed to its closed position, as will be explained. A printed circuit board 32 controls the operation of the thermal print head 30.

Figure 3:
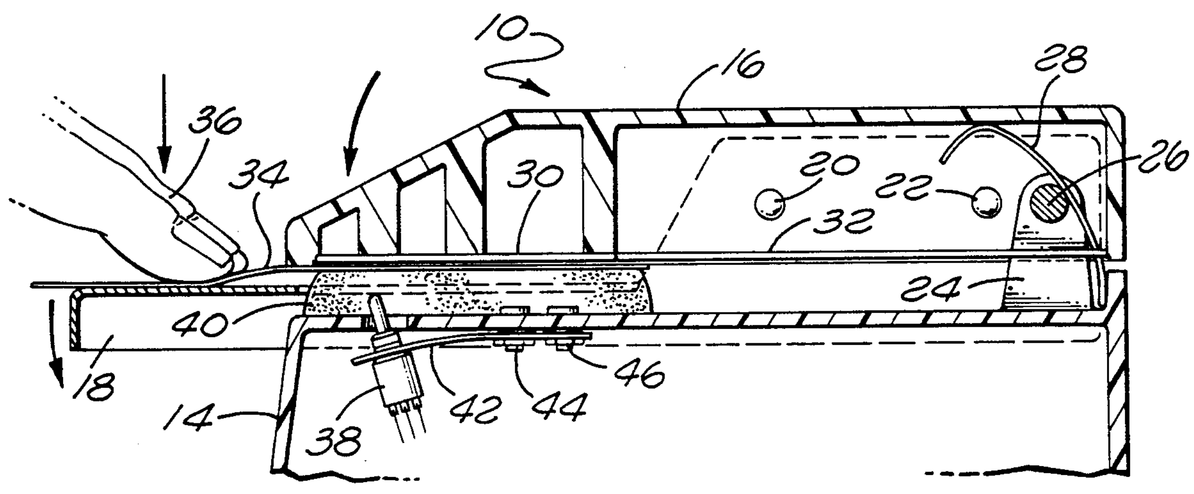
FIG. 3 is a section taken along lines 3—3 of FIG. 1 with the card shelf in the pressed down or activated position.

When the employee inserts his time card 34, which he can do with one hand 36, he presses down on the card shelf 18 after fully inserting his card 34, and rotates the card shelf 18 to its closed position as shown in FIG. 3. The employee can do this with the same hand that he is using to insert the time card 34 into the time clock 10 so that his other hand is totally free.

Insertion of the time card 34 and pressing down of the card shelf 18 to its closed position, activates a print switch 38, which tells the print head 30 to print the information desired onto the time card. A soft rubber platen 40 gives a soft surface for the card 34, to rest upon and for the thermal print head 30, to press against when printing on the time card 34.

Print switch 38 is held by a leaf spring 42 which is fixedly attached to the body portion 14 by any convenient means such as bolts 44 and 46. Leaf spring 42 allows print switch 38 to move in a downward direction when shelf 18 presses against it and leaf spring 42 returns print switch 38 to its raised position when lid 18 is released, so that print switch 38 is ready for its next activation.

The time card 34 is manufactured from thermographic paper, that is, paper on which printing takes place by the application of heat. This thermographic paper is well known in the art and is manufactured by many manufacturers such as 3-M and NCR. The print head 30 that is located inside of the time clock 10 is a thermal print head, which is adapted to record and print letters and numbers on thermographic paper. These thermal print heads are well known in the art and are manufactured by many manufacturers, such as Gulton. The particular type of print head utilized in a particular clock depends upon the thermographic paper to be used. The lowest heat range paper such as 150 degrees fahrenheit thermal print paper, is preferred since less power is used. This type of thermal printing is quite common in todays printing calculators, and the tremendous advantage of thermal printing is that it is not necessary to have ink or a ribbon of any kind because the paper is printable by the application of heat from the thermal print heads. Therefore, there is no mechanism to be maintained for advancing of ribbons, application of ink, or the use of a hammer effect, which is often commonly used in time clocks.

A microprocessor, not shown, operates a number of functions including the thermal print head 30 and the time display 12. The device of this invention provides a shorter print time and the printing on the card is essentially instantaneous so that no blurring occurs. This is due to the fact that all segments of the time and date to be printed on the card are activated simultaneously rather than in sequence as is now done in multiplexing printheads which require a mechanical card holding device or card moving device to scan across the printhead. The printing time has thus been reduced from 250 milli-seconds to 30 milli-seconds, which is effective to stop blurring problems.

In operation, the time card 34 is placed onto the card shelf 18 and inserted until it stops. Then it is aligned to a reference and pushed down to rotate lid 16 and to allow the rubber platen 40 to contact the time card 34. The rubber platen 40 holds the time card 34 firmly in place against the print head 30. As lid 16 is pushed further down, card shelf 18 activates print switch 38 which signals the micro processor to send the information and pulse timing circuit to power up the segments of the print head 30 that are needed to print the proper information onto card 34.

The print head segments are all independent, seven segments per digit, and each segment is connected to a driver transistor. The microprocessor loads a number of shift registers that turn on each transistor needed. Power is applied to the common of all segments and each conducting transistor allows current, to heat instantly, the segment connected to it. Heating takes approximately 30 milli-seconds to heat to 150 degrees. The print is very fast and cannot be smeared by movement of the time card. The loading of the shift registers takes approximately 50 milli-seconds.

The ability to print all the information needed within the total of 80 milli-seconds makes this time clock unique and practical for a simple inexpensive time clock utilizing no moving parts. Multiplexing print heads require a mechanical card holding device or card moving device to scan across the print head. These arrangements make the time clock of this style impractical and too costly for today's market.

Control of the device of the present invention is operated by a micro processor and its associated hardware. The micro processor is well known in the art and manufactured by many companies such as RCA.

The time clock of this invention may contain a "lock out" feature. This feature allows a window of time during which the employee can clock in and clock out. Before and after that window of time the time clock is rendered inoperative.

An additional feature which may be made part of this time clock is a "tardy flag". Any employee punching in after a specified time, such as 8:01 a.m., will have a mark, such as an asterisk, printed on his time card. This draws attention to that time printed. The "tardy flag" can be programmed to be removed at 12:00 noon, reappear at 12:31 p.m., to cover the lunch hour, and be removed again at the closing hour (such as 4:30 p.m.) to flag anyone leaving early.

The unique advantage of this time clock is that it is a very small self-contained unit, which can be operated by the employee with one hand. In addition, a combination of a rubber platen, which holds the card in place and the speed of the printing time makes it virtually impossible to blur the printing of the time card.

Having thus described the invention I claim:

1. A time clock device for use with a time card comprising a clock, a time display, a thermal print head hving a plurality of print segments adapted to print upon thermographic paper, said thermal print head being located in a rotatable lid, said lid having a time card shelf, driver means to simultaneously actuate a selection of said print segments upon insertion of the time card and rotation of the shelf to a closed position.

2. The device of claim 1 in which the means to actuate the thermal print segment is a print switch which actuates by pressure from the time card shelf.

3. The device of claim 1 comprising a platen upon which the time card rests at the time the print segments are actuated.

4. The device of claim 1 in which the rotating lid is biased to its open position by spring means.

5. The device of claim 1 wherein the means to activate the segments comprises a plurality of shift registers adapted to turn on a plurality of driver transistors, each segment being connected to a driver transistor.

* * * * *